March 17, 1953     W. E. SAXE     2,631,827
APPARATUS FOR CONTROLLING PROPORTIONS OF MATERIALS
Filed April 16, 1951     3 Sheets-Sheet 2
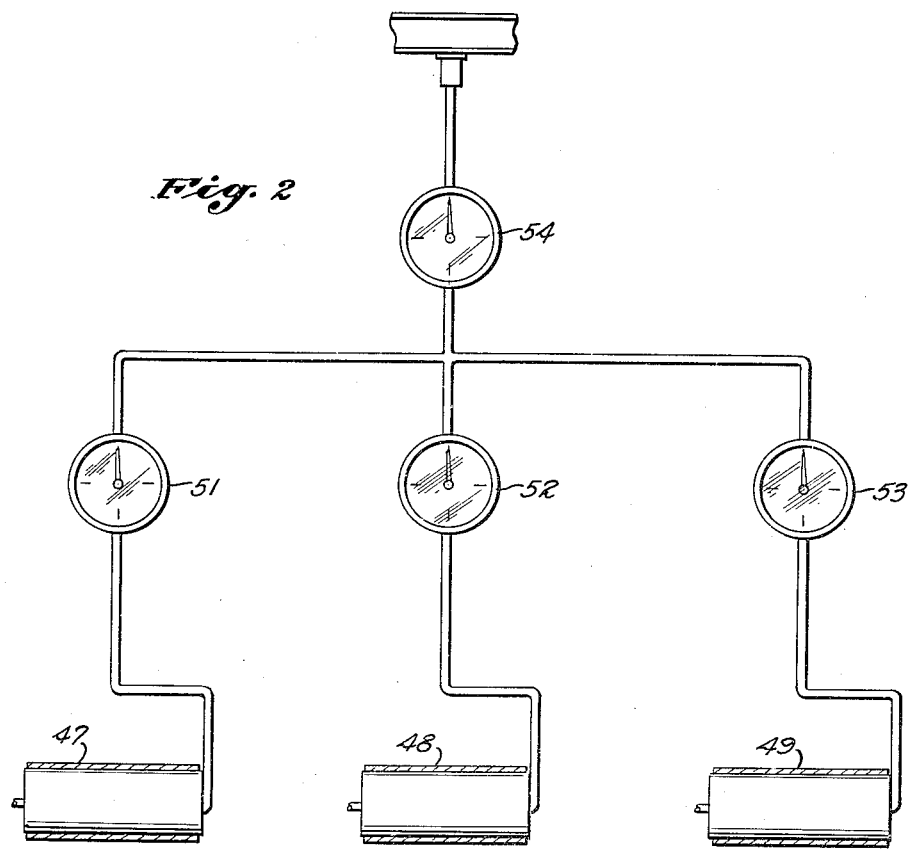
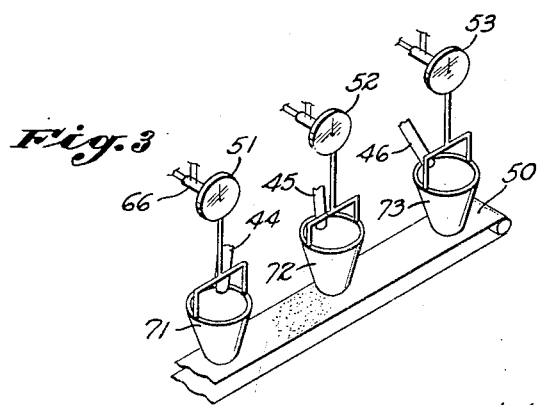
INVENTOR:
WALTER E. SAXE
BY HIS ATTORNEYS
HARRIS, KIECH, FOSTER & HARRIS March 17, 1953 W. E. SAXE 2,631,827
APPARATUS FOR CONTROLLING PROPORTIONS OF MATERIALS
Filed April 16, 1951 3 Sheets-Sheet 3
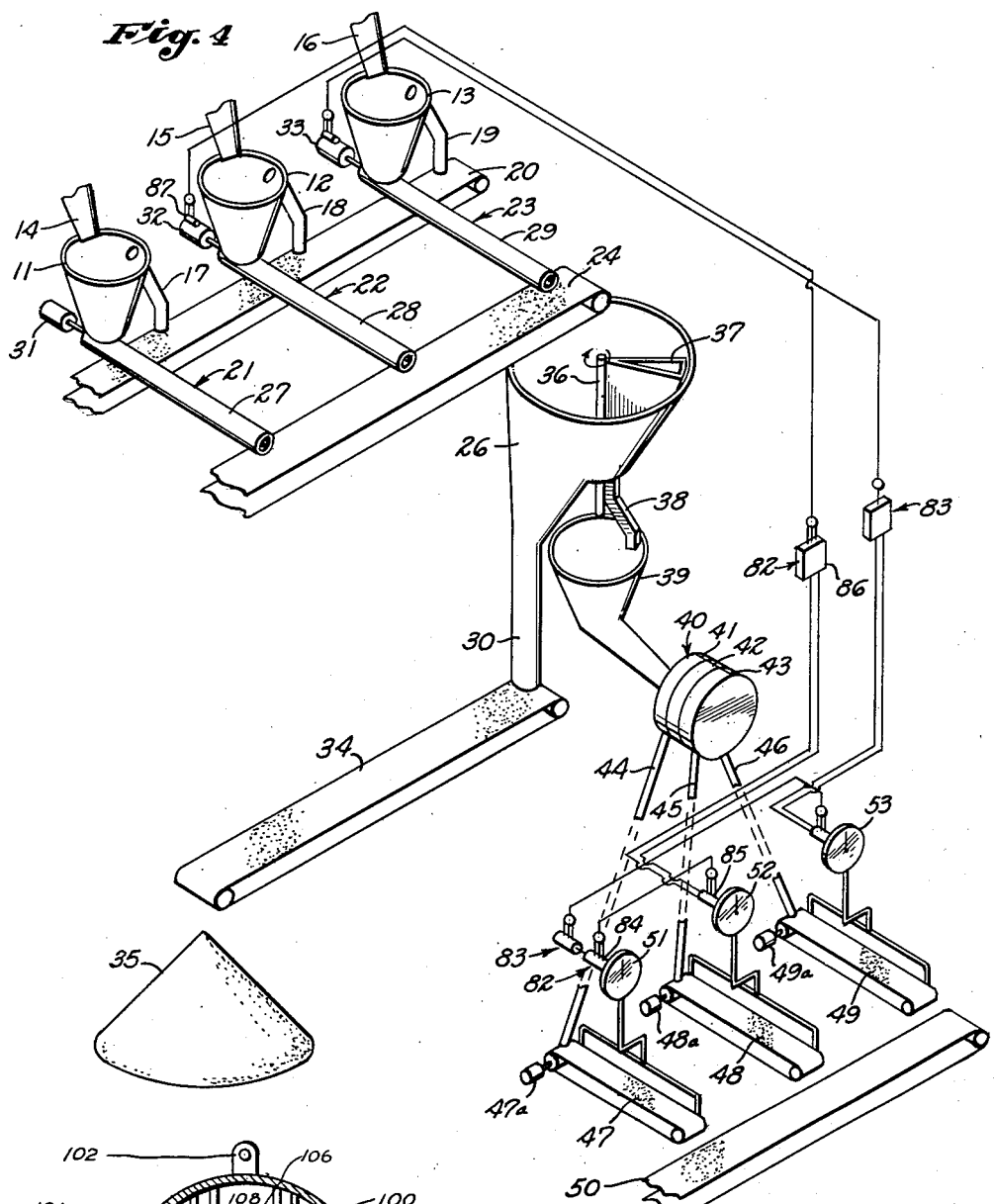
Inventor:
WALTER E. SAXE
BY HIS ATTORNEYS
HARRIS, KIECH, FOSTER & HARRIS Patented Mar. 17, 1953

2,631,827

UNITED STATES PATENT OFFICE 2,631,827

APPARATUS FOR CONTROLLING PROPORTIONS OF MATERIALS

Walter E. Saxe, Pasadena, Calif., assignor to The Conveyor Company, Inc., Los Angeles, Calif., a corporation of California Application April 16, 1951, Serial No. 221,181

19 Claims. (Cl. 259—154)

This invention relates to an apparatus for regulating the proportions of the materials in a mixture thereof, a primary object of the invention being to provide an apparatus for automatically mixing the materials in the desired proportions.

More particularly, an object of the invention is to provide an apparatus which includes proportioning means for mixing variable proportions of the materials together to obtain a mixture thereof, means for separating from each other the materials in at least a sample of the mixture, quantity measuring means having indicating devices operatively connected to receptacles containing the separated materials and responsive to the quantities of the materials therein, and control means operatively connected to the indicating devices and to the proportioning means for actuating the proportioning means to maintain the proportions of the materials in the receptacles substantially equal to prescribed values therefor.

An important object of the invention is to provide such an apparatus wherein the quantity measuring means include means providing substantially identical indications by all of the indicating devices when the proportions of the materials in the receptacles are substantially equal to the prescribed values. With this construction, an operator of the apparatus may determine readily whether the apparatus is functioning properly since all of the indicating devices indicate precisely alike so long as the materials in the mixture are in the proper proportions.

An object related to the one presented in the preceding paragraph is to provide a control means for the proportioning means which is responsive to any differences between the indications of the indicating devices.

Another object is to provide an apparatus wherein one of the indicating devices is a master indicating device and wherein the control means for the proportioning means responds to any differences between the indications of the master indicating device and the other indicating devices. A related object in connection with one embodiment of the invention is to provide a master indicating device which is responsive to the total of the quantities of the separated materials in the receptacles, and a related object in connection with another embodiment is to provide a master indicating device which is responsive to a quantity of one of the separated materials in one of the receptacles.

Another important object is to provide an apparatus which includes servomechanisms each operatively interconnecting the master indicating device and one of the other indicating devices and responsive to any differences between the indications thereof. A related object is to provide an apparatus wherein each such servomechanism includes a synchro operatively connected to and driven by the master indicating device and another synchro operatively connected to and driven by the corresponding one of the other indicating devices.

Another object is to provide a proportioning means which includes variable-speed feeding means operatively associated with storage zones for the respective materials, each feeding means being adapted to feed one of the materials from the corresponding storage zone at a rate proportional to the speed of such feeding means.

Another object is to provide an apparatus wherein the servomechanisms discussed above are operatively connected to and control the speeds of the respective variable-speed feeding means. More particularly, an object in this connection is to provide servomechanisms having means for varying the speeds of the variable-speed feeding means in response to any differences between the indications of the master indicating device and the other indicating devices, any difference between the indication of the master indicating device and the indication of one of the other indicating devices causing the two synchros driven by said indicating devices to increase or decrease the speed of one of the variable-speed feeding devices as required to bring the two indicating devices back into balance.

Another object is to provide an apparatus which includes means for splitting off from the mixture a sample which is then separated into its components, the latter being subsequently delivered to the respective receptacles to which the indicating devices are operatively connected.

Another object is to provide an apparatus for controlling the proportions of materials differing in particle size and for controlling the proportions of such materials by weight. In this connection, an object is to provide a separating means which includes screens differing in mesh for separating the materials from each other according to particle size, and in which the indicating devices referred to above are scales responsive to the weights of the separated materials.

Another object is to provide an apparatus wherein the receptacles for the separated materials may be continuously operating conveyors, hoppers, or the like.

Another important object of the invention is to provide an apparatus which may be operated continuously to provide continuous control and indications of the proportions of the materials. A related object is to provide such an apparatus which is capable of operating continuously without compensation for fluctuations in the flow therethrough.

The foregoing objects and advantages of the present invention, together with various other objects and advantages thereof which will become apparent, may be attained with the exemplary embodiments of the invention illustrated in the accompanying drawings and described in detail hereinafter.

Referring to the drawings:

Fig. 2 is an elevational view, in diagrammatic form, of a part of the embodiment of Fig. 1;

Fig. 3 is a diagrammatic perspective view, in fragmentary form, of another embodiment of the invention;

Fig. 4 is a diagrammatic perspective view which is similar to Fig. 1 but which illustrates still another embodiment of the invention; and Fig. 5 is a diagrammatic view of a spring scale which may be incorporated in the various embodiments of the invention.

Figure 1:
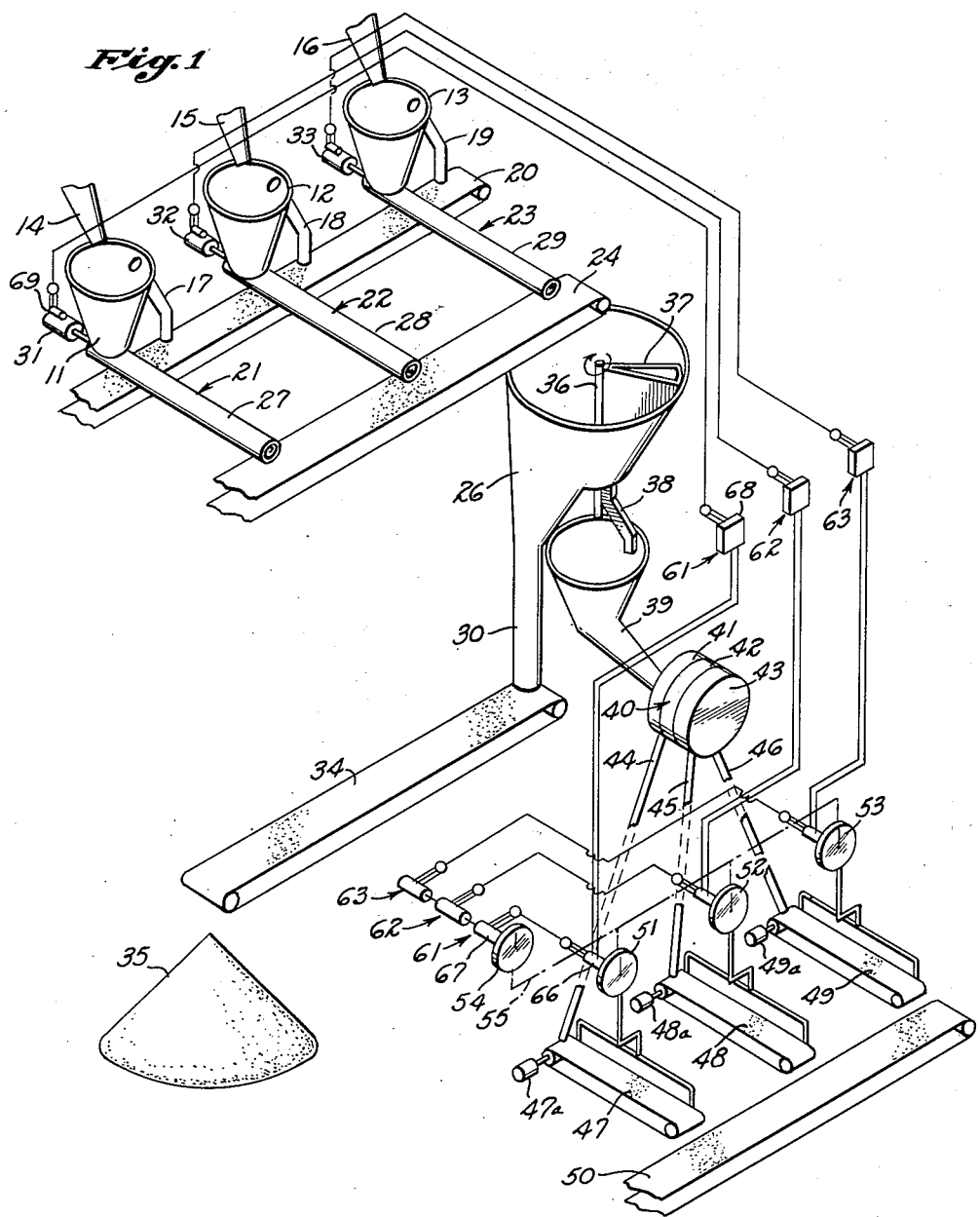
Fig. 1 is a diagrammatic perspective view of one embodiment of the invention.

For convenience in disclosing the invention, embodiments for controlling the proportions of materials differing in particle size and for controlling the proportions of such materials by weight will be considered. However, it will be understood that criteria other than particle size may be employed and that the proportions may be controlled with respect to characteristics other than weight without departing from the spirit of the invention so that I do not intend to be limited specifically thereto. Since the invention is of particular utility in controlling the proportions of different sands in preparing sand mixtures for use in concrete, for example, I prefer to consider the invention in such connection herein as a further matter of convenience. However, it will be understood that the embodiments disclosed herein may be employed for controlling the proportions by weight of any materials differing in particle size without departing from the spirit of the invention so that it will be understood that I do not intend to be limited to the use of the embodiments disclosed herein for controlling the proportions of sands in sand mixtures.

Referring now to Fig. 1 of the drawings, the proportion-controlling apparatus illustrated therein includes three storage zones, exemplified as storage bins 11, 12 and 13. The latter are supplied with different sands or grades of sand, i. e., sands differing in particle size, through chutes 14, 15 and 16, respectively, in any suitable manner, as, for example, in the manner illustrated in my copending application Serial No. 209,500, filed February 5, 1951, now Patent 2,587,531 of February 26, 1952. If desired, overflow spouts 17, 18 and 19 may be provided to discharge any overflows from the respective bins 11, 12 and 13 onto an overflow conveyor 20.

Operatively associated with the respective storage bins 11, 12 and 13 are variable-speed feeding means 21, 22 and 23, respectively, such feeding means discharging onto a mixing conveyor 24 and cooperating therewith to provide a proportioning means for mixing variable proportions of the grades of sand in the three storage bins. In the particular construction illustrated, the three variable-speed feeding means 21, 22 and 23 respectively comprise screw conveyors 27, 28 and 29 discharging onto the mixing conveyor 24 and respectively driven by variable-speed electric motors 31, 32 and 33. As will be apparent, the proportions of the three grades of sand which are mixed together in this manner may be controlled by controlling the speeds of the three variable-speed motors 31, 32 and 33, the manner in which this is done being discussed in detail hereinafter.

Mounted below the discharge end of the mixing conveyor 24 so as to receive the resulting mixture therefrom is a hopper 26 having a main discharge spout 30 which discharges onto a conveyor 34 leading to any suitable point of use or storage, such as a stock pile 35. Rotatably mounted in the hopper 26 is a substantially vertical shaft 36 which may be driven in any suitable manner, not shown. The shaft carries a sector-shaped compartment which is provided with a depending auxiliary spout 38. This construction provides a splitting means for dividing the mixture discharged into the hopper 26 from the mixing conveyor 24 into a sample and a residue, the sample discharging through the auxiliary spout 38 and the residue discharging through the main spout 30 onto the residue conveyor 34 leading to the stock pile 35, or elsewhere. In practice, the sample taken by this splitting means is a few percent of the mixture discharged into the hopper 26, although the sample may represent any desired percentage of the mixture greater than zero.

The sample obtained by the splitting means represented by the rotating compartment 37 and the spout 38 discharges from the spout 38 into a hopper 39 which, in turn, discharges into a screening means, illustrated as a rotatable cylindrical trommel 40. The latter separates the three grades of sand in the sample from each other and, for this purpose, is provided with three screens 41, 42 and 43 of meshes corresponding to the particle sizes of the three grades of sand. The three separated grades of sand derived from the sample by the trommel 40 are conveyed by chutes 44, 45 and 46, respectively, to receptacles which are illustrated as continuously operating conveyors 47, 48 and 49, respectively, such conveyors being driven continuously in any suitable manner, as by motors 47a, 48a and 49a, respectively, and discharging onto a conveyor 50 leading to a suitable point of use or storage, such as the stock pile 35. Operatively connected to the three conveyors 47, 48 and 49 and cooperating therewith to form quantity responsive means are individual indicating devices responsive to the quantities of material on the respective conveyors, such indicating devices being exemplified as scales 51, 52 and 53 responsive to the weights of the grades of sand on the respective conveyors 47, 48 and 49 in the particular embodiment illustrated. Also operatively connected to the three conveyors 47, 48 and 49 in a manner to be responsive to the total of the weights of the grades of sand on the three conveyors is a master scale 54, the operative connection being designated by the broken line 55. Referring to Fig. 2 of the drawings, the individual scales 51, 52 and 53 are diagrammatically shown as supporting the respective conveyors 47, 48 and 49 for purposes of illustration, and the master scale 54 is diagrammatically shown as supporting all three of the conveyors 47, 48 and 49, also for purposes of illustration. As will be understood, any suitable operative connections between the scales 51 to 54 and the conveyors 47 to 49 may be employed.

An important feature of the present invention is that the weighing means is provided with means for maintaining the indications provided by the scales 51 to 54 identical so long as the proportions of the grades of sand derived from the sample and delivered to the conveyors 47 to 49 are equal to certain desired or prescribed values necessary for the use to be made of the mixture. The scales 51 to 54 may be caused to read alike under such conditions in various ways. For example, spring scales, or scales incorporating springs in their mechanisms, may be employed for the scales 51 to 54, and by employing in the respective scales springs having spring constants proportional to the prescribed percentages for the sand grades. As an example, let us assume that the proportion of the grade of sand delivered to the conveyor 47 is to be maintained at 20% by weight, the proportion of the grade of sand delivered to the conveyor 43 is to be maintained at 30% by weight, and the proportion of the grade of sand delivered to the conveyor 49 is to be maintained at 50% by weight, all with reference to the total weight to which the master scale 54 is responsive. Thus, by employing in the scale 51 a spring having a spring constant of 20, by employing in the scale 52 a spring having a spring constant of 30, by employing in the scale 53 a spring having a spring constant of 50, and by employing in the master scale 54 a spring having a spring constant of 100, it will be seen that all of the scales will read exactly alike so long as the weights of the sand grades on the conveyors 47 to 49 are equal to the prescribed percentages. Alternatively, spring constants proportional to the percentages may be employed by using a constant proportionality factor for all of the springs. It will be understood that the percentage values cited above are intended as illustrative only and that the invention is not to be regarded as limited thereto.

Referring to Fig. 5 of the drawings, illustrated therein is a typical spring scale 100 which may be used as any one of the scales 51 to 54 discussed above. The scale 100 includes a housing 101 which may be suspended from hanger 102. The scale 100 also includes two springs 103 each of which is anchored at its upper end to the housing 101, the lower ends of the springs 103 being connected to a member 104 having a hanger 105 to which the container carrying material to be weighed may be connected. Connected to the member 104 is a rack 106 which meshes with a pinion 107 connected to a pointer 108 of the scale 100. It will be understood that the spring scale 100 is illustrative only and that various other types of spring scales may be employed for the scales 51 to 54.

As will be apparent, the scales 51 to 54 may be caused to read or indicated alike as long as the percentages are equal to the prescribed values in various other ways. For example, the scales may be provided with beams having fulcrums whose positions may be adjusted to produce the desired results.

When the scales 51 to 54 are caused to read alike in any of the foregoing ways, the speeds of the conveyors 47 to 49 must be equal.

As will be apparent, the presence of means in the weighing means for causing the scales 51 to 54 to indicate alike so long as the weights of sand on the conveyors 47 to 49 are equal to the prescribed values permits the operator of the proportion-controlling apparatus to determine readily whether or not the desired proportions are being met. In other words, if there is any inequality or lack of identity between the indications of the scales 51 to 54, the operator is immediately advised that the desired proportions are not being met, which is an important feature of the invention. Also, this feature facilitates control of the proportions through regulation of the speeds of the variable-speed motors 31 to 33 in a manner about to be described.

The speeds of the variable-speed motors 31 to 33 are regulated by a control means which is responsive to any difference between the indications of the individual scales 51 to 53 and the master scale 54, the control means functioning to maintain the speeds of the variable-speed motors at values which will maintain equality between the indications of the scales. More particularly, the control means includes three servomechanisms 61, 62 and 63 operatively connected to the master scale 54 and respectively operatively connected to the variable-speed motor 31 and the individual scale 51, the variable-speed motor 32 and individual scale 52, and the variable-speed motor 33 and the individual scale 53. The servomechanisms 61, 62 and 63 are identical so that only one, viz., the servomechanism 61, will be considered in detail.

The servomechanism 61 includes a synchro or "Selsyn" having its rotor connected to the indicator shaft of the scale 51 so that the position of such rotor corresponds to that of the indicator of said scale. Similarly, a synchro 67 has its rotor connected to the indicator shaft of the master scale 54 so that the position of such rotor corresponds to the position of the indicator on the master scale. The synchros 66, 67 are interconnected in the conventional manner so that, as long as the indicators of the scales 51 and 54 indicate alike, a null condition exists, i. e., no signal is produced by the synchros. However, any difference between the indications of the scales 51 and 54 produces a signal which is transmitted to a relay 68, the latter being connected to the synchro system 66, 67. The relay 68, in turn, is connected to a speed control 69 on the motor 31. In the servomechanism 61, the relay 68 may, for example, include a reversing switch which is selectively responsive to positive or negative differential signals from the synchros 66 and 67, and the speed control 69 may include a small reversible motor controlled by such switch and actuating means on the variable-speed motor 31 for varying the speed thereof, any suitable speed-varying means known in the art being usable. With this construction, if the indication of the scale 51 is less than that of the master scale 54, indicating a deficiency in the weight of the sand grade on the conveyor 47, the synchro system 66, 67 responds, through the relay 68 and the speed control 69, to increase the speed of the variable-speed motor 31, thereby delivering more of this sand grade to the mixing conveyor 24. Conversely, if the indication of the scale 51 is higher than that of the master scale 54, indicating an excess of the sand grade on the conveyor 47, the speed of the variable-speed motor 31 is decreased to reduce the amount of this sand grade delivered to the mixing conveyor 24.

Each of the servomechanisms 62 and 63 includes similar elements and operates in the same way to control the proportion of the corresponding sand grade, the three synchros of the servomechanisms 61, 62 and 63 which are associated with the master scale 54 being diagrammatically shown as connected in axial alignment.

For convenience, the connections between the various elements of the servomechanisms 61, 62 and 63 have been shown diagrammatically to avoid unduly complicating the drawings. It will be noted that wherever three-wire systems may be necessary, such systems have been shown as merging into single cables to avoid an excessive number of lines in the drawings.

Briefly considering the over-all operation of the proportion-controlling apparatus illustrated in Figs. 1 and 2 of the drawings, the variable-speed feeding means 21 to 23 deliver variable proportions of the different grades of sand in the storage bins 11 to 13 to the mixing conveyor 24. The resulting mixture is divided into a residue and a sample by the splitting means represented by the rotating sector-shaped compartment 37 and auxiliary spout 38, the residue being delivered to the stock pile 35, for example, and the sample being delivered to a means, exemplified as the trommel 40, for separating the sand grades in the sample from each other. These sand grades are then delivered to the conveyors 47 to 49 and are weighed by the respective individual scales 51 to 53, the total weight being indicated by the master scale 54. Any differences between the indications of the individual scales 51 to 53 and the master scale 54 result in the generation of signals in the servomechanisms 61 to 63, such signals being applied to the variable-speed motors 31 to 33 to vary the speeds thereof as required to maintain equalities of the indications of the scales 51 to 54. Since the scales 51 to 54 are designed to indicate alike as long as the proportions of the sand grades are equal to prescribed values, any differences between the readings of the scales 51 to 54 represent one or more departures of these proportions from the prescribed values. Thus, the operator of the apparatus is provided with a direct visual indication that the prescribed values for the proportions are or are not being met. If the indications of the scales 51 to 54 differ, the operator is immediately advised that the prescribed proportions are not being met and may immediately take whatever corrective steps may be necessary, such as adjustments or repair of the apparatus, and the like.

It will be understood that while I have disclosed a proportion controlling apparatus capable of handling three different materials, e. g., grades of sand, the invention is not to be regarded as limited to this number since it may readily be increased or decreased as desired by increasing or decreasing the numbers of storage bins, variable-speed feeding means, scale conveyors, scales, screens in the trommel 40 and servomechanisms.

Also, while I have shown scale conveyors as receptacles for the sand grades derived from the sample, it will be understood that any suitable receptacles may be employed. For example, as shown in Fig. 3 of the drawings, hoppers 71 to 73 may be substituted for the scale conveyors 47 to 49, respectively, such hoppers being provided with gates, or the like, not shown, for periodically dumping the contents thereof onto the disposal conveyor 59.

The embodiment of the invention which is illustrated in Fig. 4 of the drawings is similar to that illustrated in Fig. 1 and identical reference numerals are employed to designate corresponding components for convenience. The only differences between the embodiments of Figs. 1 and 4 are that the latter eliminate the total-weight master scale 54, the individual scale 51 being employed as a master scale, and employs only two servomechanisms 82 and 83. The servomechanism 82 is operatively connected to the master scale 51 and the scale 52 and to the variable-speed motor 32, being responsive to any differences between the indications of the master scale 51 and the scale 52. Similarly, the servomechanism 83 is operatively connected to the master scale 51 and the scale 53 and to the variable-speed motor 33, being responsive to any differences between the indications of the master scale 51 and the scale 53. The servomechanism 82 includes a synchro 84 whose rotor is driven by the master scale 51, and includes a synchro 85 whose rotor is driven by the scale 52, these synchros being connected to a relay 86 which, in turn, is connected to a speed control 87 for the variable-speed motor 32. Thus, as in the embodiments previously discussed, any difference between the indications of the master scale 51 and the scale 52 operates the relay 86 to cause the speed control 87 to increase or decrease the speed of the variable-speed motor 32 as required to maintain the indications of the master scale 51 and the scale 52 equal. The servomechanism 83 includes identical elements and will not be described in detail.

As previously discussed, the relay 86 may include a reversing switch selectively responsive to positive or negative differential signals from the synchros 84 and 85 of the servomechanism 82 and the speed control 87 may be a small reversible motor controlled by the relay 86 and actuating means for varying the speed of the variable-speed motor 32.

Considering the over-all operation of the proportion controlling apparatus of Fig. 4 of the drawings, it will be apparent that, in this embodiment, the scale 51 acts as a monitor, instead of the scale 54 in the previous embodiment. Thus, if the weights of the sand grades on the conveyors 48 and 49 deviate from their prescribed values, the servomechanisms 82 and 83 bring such weights back into line. Conversely, should the proportion on the conveyor 47 to which the master scale 51 is connected deviate, the proportions on the other two conveyors 48 and 49 will be adjusted to match. Thus, it will be seen that similar results are obtained with a smaller number of components, which is an important feature of this embodiment. If desired, the output of the embodiment of Fig. 4 of the drawings may readily be controlled by varying the speed of the variable-speed feeding means 21. This varies the proportion of the sand grade on the conveyor 47, but the servomechanisms 82 and 83 automatically change the proportions on the conveyors 48 and 49 to match so that precisely the desired proportions are maintained.

It will be understood that, as previously discussed, the embodiment of Fig. 4 may be modified readily by adding or subtracting elements so as to enable it to handle a greater or lesser number of materials than the three disclosed.

Another way of causing the scales 51 to 53 to read alike in the embodiment of Figs. 1 and 2 and in that of Fig. 4 when the prescribed proportions are being met is to use identical scales and to drive the conveyors 47 to 49 at speeds proportional to the respective prescribed proportions, in which case the motors 47a, 48a and 49a may be variable-speed motors. With this construction, a sand grade which is delivered to the corresponding conveyor at a high rate, i. e., corresponding to a high proportion, does not remain on the conveyor as long as those delivered at lower rates, i. e., in lower proportions, so that the total weights on the conveyors are equal to provide equal indications. As before, deviations in the indications of the scales 51 to 53 from equality indicate departures from the prescribed proportions.

Although I have disclosed various exemplary embodiments of my invention and have discussed exemplary applications thereof, it will be understood that the invention is susceptible of other applications and that various changes, modifications and substitutions may be incorporated in the embodiments disclosed without departing from the spirit of the invention.

I claim as my invention:

1. In an apparatus for controlling the proportions of materials, the combination of: proportioning means for mixing variable proportions of the materials together to obtain a mixture thereof; means for separating from each other the materials in at least a sample of the mixture; receptacles for the respective separated materials; means for conveying the separated materials from said separating means to said receptacles, respectively; quantity responsive means including indicating devices operatively connected to said receptacles and responsive to the quantities of the materials therein, said quantity responsive means including means providing substantially identical indications by all of said indicating devices when the quantities of the materials in said receptacles are substantially equal to prescribed values therefor, one of said indicating devices being a master indicating device; and control means operatively connected to said indicating devices and to said proportioning means and responsive to any differences between the indications of said master indicating device and the other indicating devices for actuating said proportioning means to maintain the quantities of the materials in said receptacles substantially equal to said prescribed values.

2. An apparatus as defined in claim 1 wherein said proportioning means includes variable-speed feeding devices for the respective materials.

3. An apparatus as defined in claim 2 wherein said control means include servomechanisms operatively connected to said indicating devices and to said variable-speed feeding devices.

4. In an apparatus for controlling the proportions of materials, the combination of: proportioning means for mixing variable proportions of the materials together to obtain a mixture thereof; splitting means receiving the mixture from said proportioning means for dividing the mixture into a sample and a residue; means for separating the materials of the sample from each other; means for conveying the sample to said separating means; receptacles for the respective separated materials derived from the sample; means for conveying the separated materials derived from the sample from said separating means to said receptacles, respectively; quantity responsive means including indicating devices operatively connected to said receptacles and responsive to the quantities of the materials therein, said quantity responsive means including means providing substantially identical indications by all of said indicating devices when the quantities of the materials in said receptacles are substantially equal to prescribed values therefor, one of said indicating devices being a master indicating device; and control means operatively connected to said indicating devices and to said proportioning means and responsive to any differences between the indications of said master indicating device and the other indicating devices for actuating said proportioning means to maintain the quantities of the materials in said receptacles substantially equal to said prescribed values.

5. In an apparatus for controlling the proportions of materials, the combination of: proportioning means for mixing variable proportions of the materials together to obtain a mixture thereof; splitting means receiving the mixture from said proportioning means for dividing the mixture into a sample and a residue; means for separating the materials of the sample from each other; means for conveying the sample to said separating means; receptacles for the respective separated materials derived from the sample; means for conveying the separated materials derived from the sample from said separating means to said receptacles, respectively; quantity responsive means including indicating devices operatively connected to said receptacles and responsive to the quantities of the materials therein, said quantity responsive means including means providing substantially identical indications by all of said indicating devices when the quantities of the materials in said receptacles are substantially equal to prescribed values therefor, one of said indicating devices being a master indicating device; and servomechanisms each operatively connected to said master indicating device and one of the other indicating devices and each operatively connected to said proportioning means, whereby said servomechanisms respond to any differences between the indications of said master indicating device and said other indicating devices to actuate said proportioning means so as to maintain the quantities of the materials in said receptacles substantially equal to said prescribed values.

6. In an apparatus for controlling the proportions of materials, the combination of: storage zones for the respective materials; proportioning means for mixing variable proportions of the materials together to obtain a mixture thereof, including variable-speed feeding devices operatively associated with said storage zones, respectively, for feeding the respective materials from said storage zones; splitting means receiving the mixture from said proportioning means for dividing the mixture into a sample and a residue; means for separating the materials of the sample from each other; means for conveying the sample to said separating means; receptacles for the respective separated materials derived from the sample; means for conveying the separated materials derived from the sample from said separating means to said receptacles, respectively; quantity responsive means including indicating devices operatively connected to said receptacles and responsive to the quantities of the materials therein, said quantity responsive means including means providing substantially identical indications by all of said indicating devices when the quantities of the materials in said receptacles are substantially equal to prescribed values therefor, one of said indicating devices being a master indicating device; and servomechanisms each operatively connected to said master indicating device and one of the other indicating devices and to one of said variable-speed feeding devices, said servomechanisms being responsive to any differences between the indications of said master indicating device and the other indicating devices so as to operate said variable-speed feeding devices at such speeds as to maintain the quantities of the materials in said receptacles substantially equal to said prescribed values.

7. In an apparatus as defined in claim 6 wherein each of said servomechanisms includes a synchro operatively connected to said master indicating device and another synchro operatively connected to one of the others of said indicating devices.

8. An apparatus as defined in claim 6 wherein said master indicating device is operatively connected to all of said receptacles so as to respond to the total of the quantities of the materials in said receptacles, the others of said indiciating devices being operatively connected to said receptacles, respectively, so as to respond to the quantities, respectively, of the materials therein.

9. An apparatus according to claim 6 wherein said master indicating device is operatively connected to one of said receptacles so as to respond to the quantity of the material therein, the others of said indicating devices being operatively connected to the others of said receptacles, respectively, so as to respond to the respective quantities of the materials therein.

10. In an apparatus for controlling the proportions by weight of materials which differ in particle size, the combination of: storage zones for the respective materials; proportioning means for mixing variable proportions of the materials together to obtain a mixture thereof, including variable-speed feeding devices operatively associated with said storage zones, respectively, for feeding the respective materials therefrom; splitting means receiving the mixture from said proportioning means for dividing the mixture into a sample and a residue; means including screens differing in mesh for separating the materials of the sample from each other; means for conveying the sample to said separating means; receptacles for the respective separated materials derived from the sample; means for conveying the separated materials derived from the sample from said separating means to said receptacles, respectively; quantity responsive means including scales operatively connected to said receptacles and responsive to the weights of the materials therein, said quantity responsive means including means providing substantially identical indications by all of said scales when the weights of the materials in said receptacles are substantially equal to prescribed values therefor, one of said scales being a master scale; and control means operatively connected to said scales and said variable-speed feeding devices and responsive to any differences between the indications of said master scale and the other scales for regulating the speeds of said variable-speed feeding devices to eliminate such differences, whereby to maintain the weights of the materials in said receptacles substantially equal to said prescribed values.

11. An apparatus according to claim 10 wherein said master scale is operatively connected to all of said receptacles so as to respond to the total of the weights of the materials therein, the others of said scales being operatively connected to said receptacles, respectively, so as to respond to the respective weights of the materials therein.

12. An apparatus according to claim 10 wherein said master scale is operatively connected to one of said receptacles so as to respond to the weight of the material therein, the others of said scales being operatively connected to others of said receptacles, respectively, so as to respond to the respective weights of the materials therein.

13. In an apparatus for controlling the proportions by weight of materials which differ in particle size, the combination of: storage zones for the respective materials; proportioning means for mixing variable proportions of the materials together to obtain a mixture thereof, including variable-speed feeding devices operatively associated with said storage zones, respectively, for feeding the respective materials therefrom; splitting means receiving the mixture from said proportioning means for dividing the mixture into a sample and a residue; means including screens differing in mesh for separating the materials of the sample from each other; means for conveying the sample to said separating means; receptacles for the respective separated materials derived from the sample; means for conveying the separated materials derived from the sample from said separating means to said receptacles, respectively; quantity responsive means including scales operatively connected to said receptacles and responsive to the weights of the materials therein, said quantity responsive means including means providing substantially identical indications by all of said scales when the weights of the materials in said receptacles are substantially equal to prescribed values therefor, one of said scales being a master scale; and servomechanisms each operatively connected to said master scale and one of the others of said scales and to one of said variable-speed feeding devices and responsive to any differences between the indications of said master scale and said one of said other scales for regulating the speed of said one variable-speed feeding device, whereby to maintain the weights of the materials in said receptacles substantially equal to said prescribed values.

14. An apparatus according to claim 13 wherein each of said servomechanisms includes a synchro operatively connected to said master scale and another synchro operatively connected to one of the others of said scales.

15. In an apparatus for controlling the proportions of materials, the combination of: proportioning means for mixing variable proportions of the materials together to obtain a mixture thereof; means for separating from each other the materials of at least a sample of the mixture; means for conveying at least a sample of the mixture to said separating means; receptacles for the respective separated materials derived from said separating means; means for conveying the separated materials from said separating means to said receptacles, respectively; quantity responsive means including devices operatively connected to said receptacles and responsive to the quantities of the materials therein, said devices including movable elements and said quantity responsive means including means for moving said movable elements to predetermined corresponding positions when the quantities of the materials in said receptacles are substantially equal to prescribed values therefor, one of said devices being a master device; and control means operatively connected to said devices and to said proportioning means and responsive to any deviations of said movable elements from said corresponding positions for actuating said proportioning means to maintain the quantities of the materials in said receptacles substantially equal to said prescribed values.

16. In an apparatus for measuring the proportions of materials, the combination of: a group of receiving devices for the respective materials and a group of indicating devices, said indicating devices being operatively connected to said receiving devices, said devices of one of said groups being provided with movable elements; control means operatively connectible to said movable elements for maintaining the indications provided by said indicating devices substantially identical when the quantities of the materials in said receiving devices are substantially equal to prescribed values therefor; and means operatively connecting said control means to said movable elements.

17. An apparatus as defined in claim 16 wherein said indicating devices are scales having pointers and wherein said movable elements are said pointers, said control means including springs in said scales which are operatively connected to said pointers, respectively, and which have spring constants proportional to said prescribed values, respectively.

18. An apparatus according to claim 16 wherein said receiving devices are conveyors respectively provided with movable conveying elements which are said movable elements, respectively, said control means including means operatively connected to said conveying elements for driving said conveying elements at speeds proportional to said prescribed values, respectively.

19. An apparatus as defined in claim 18 wherein said means for driving said conveying elements comprises variable-speed electric motors operatively connected to said conveying elements, respectively.

WALTER E. SAXE.

REFERENCES CITED

The following references are of record in the file of this patent:

UNITED STATES PATENTS

| Number | Name | Date |
|---|---|---|
| 2,285,765 | Carswell | June 9, 1942 |
| 2,344,228 | Barber | Mar. 14, 1944 |